United States Patent [19]
Greve

[11] Patent Number: 6,103,032
[45] Date of Patent: Aug. 15, 2000

[54] SHEET MOLDING COMPOUND MANUFACTURING IMPROVEMENTS

[75] Inventor: Bruce N. Greve, Clarkston, Mich.

[73] Assignee: The Budd Company, Troy, Mich.

[21] Appl. No.: 09/066,220

[22] Filed: Apr. 24, 1998

[51] Int. Cl.⁷ .................................................. B32B 31/14
[52] U.S. Cl. .................... 156/62.2; 156/152; 156/285; 156/324; 156/382; 264/112
[58] Field of Search .................... 156/152, 62.2, 156/247, 285, 324, 382, 547; 264/112

[56] References Cited

U.S. PATENT DOCUMENTS

| | | |
|---|---|---|
| 3,895,988 | 7/1975 | Miller . |
| 4,092,393 | 5/1978 | Morocco . |
| 4,288,475 | 9/1981 | Meeker . |
| 4,385,954 | 5/1983 | Pauls et al. ........................ 156/144.21 |
| 4,488,862 | 12/1984 | Epel et al. . |
| 4,551,085 | 11/1985 | Epel et al. . |
| 4,612,149 | 9/1986 | Iseler et al. . |
| 4,894,292 | 1/1990 | Dibuz et al. . |
| 5,130,071 | 7/1992 | Iseler et al. . |

FOREIGN PATENT DOCUMENTS

| | | |
|---|---|---|
| 0103954 | 7/1983 | European Pat. Off. . |
| 2266595 | 5/1974 | France . |
| 2704477 | 4/1993 | France . |

OTHER PUBLICATIONS

Owens–Corning Fiberglas Corporation, *Reducing SMC Porosity—Studies Show It Can be Done* .

*Primary Examiner*—Sam Chuan Yao
*Attorney, Agent, or Firm*—Harness, Dickey & Pierce, P.L.C.

[57] ABSTRACT

The present invention provides an apparatus and method for manufacturing sheet molding compound including a fiber processing unit for forming a fiber web, and a vacuum chamber unit having a resin paste dispenser, wherein the paste is applied to the fiber web within the vacuum chamber for minimizing entrapped air within the compound.

11 Claims, 2 Drawing Sheets

SHEET MOLDING COMPOUND MANUFACTURING IMPROVEMENTS

BACKGROUND OF THE INVENTION

1. Field of the Invention

The present invention relates generally to an apparatus and method for manufacturing sheet molding compound, and, more particularly, to an apparatus for manufacturing sheet molding compound while minimizing entrapped air therein.

2. Discussion of the Related Art

Compression molding is a technique for forming parts wherein a charge is placed between upper and lower heated die members defining a mold cavity. The dies are then brought to a closed position where the dies compress the charge causing it to flow and fill the mold cavity. After the resin cures, the molds are opened and the finished part is removed.

Compression molding techniques have been used to make parts having a relatively flat surface, such as exterior automotive body panels. The charges used for making such parts generally consist of a thermosetting resin containing reinforcing fibers and various fillers. Quite often, the charges are formed into sheets known in the art as sheet molding compounds (SMC). It has been difficult, however, to mold fiberglass reinforced plastic (FRP) parts so that they have an extremely smooth surface. The molded parts sometimes have surfaces that are blistered, rough or porous that require post-molding processing to smooth the blemishes. It is commonly believed that such blemishes result primarily from air that is trapped in the charge during molding. In an effort to minimize trapped air, one practice is to use a relatively thick charge which covers a relatively small area of the molding surface so that the air in the charge is "squeezed" out when the dies are closed.

It has also been recognized that the use of a vacuum during the compression molding process is useful in reducing the number of blemishes in the surface of the part. See, e.g., U.S. Pat. Nos. 4,488,862; 4,612,149; 4,551,085; and 5,130,071, which are hereby incorporated by reference. These prior patents teach applying a vacuum to the sheet molding compound charge during the compression molding process. Air also becomes entrapped, however, within the reinforcing fibers themselves while the fibers are mixed with the resin mixture paste during the manufacturing of the sheet molding compound charge. This trapped air can lead to voids or micro-pits on the surface of a molded part, requiring additional labor-intensive finishing procedures in order to produce a part with an acceptable surface thereby increasing manufacturing costs. There thus exists a need in the art to provide an improved method and apparatus for removing or minimizing entrapped air from the resin mixture paste and fiber reinforcing material while the sheet molding compound is formed in order to further reduce the occurrence of surface blemishes on molded articles.

SUMMARY OF THE INVENTION

The present invention provides an apparatus for manufacturing sheet molding compound comprising a fiber processing unit for forming a fiber web. The apparatus also includes a vacuum chamber unit having a resin paste dispenser, wherein the paste is applied to the fiber web within the chamber while under a vacuum. The apparatus functions to minimize entrapped air from the resin mixture paste and fiber web with the use of a vacuum chamber.

The preferred embodiment of the present invention also provides an apparatus for manufacturing sheet molding compound comprising a fiber mixture water bath, a conveyor belt that receives the fiber mixture, and a soluble binder resin dispenser unit. The apparatus includes a dryer unit and at least two plastic film rolls that release a layer of plastic film onto the conveyor belt, wherein the fiber mixture is sandwiched between a first and second plastic layer to form a plastic layered fiber web. A vacuum chamber has a resin paste dispenser, a first mechanism that separates the first plastic layer from the second plastic layer, and kneading rollers. The paste is applied to the fiber web when the plastic layers are separated. Then, the first layer is returned to cover the fiber web and paste mixture by way of a second mechanism. The apparatus further has an output unit, wherein the sheet molding compound is rolled or festooned in a box.

The present invention is additionally directed to a method of manufacturing sheet molding compound comprising, in the preferred embodiment, the steps of forming a fiber web, compressing the fiber web between at least two layers of plastic film along a first moving mechanism, and separating a first plastic layer along a second moving mechanism from the fiber web within a vacuum chamber. The present method also includes applying the resin mixture paste onto the fiber web within the vacuum chamber, and returning the first plastic layer to the fiber web. The paste and fiber web are kneaded to mix the fiber into the paste, and the compound thereafter exits the vacuum chamber along the first moving mechanism.

DETAILED DESCRIPTION OF THE PREFERRED EMBODIMENT(S)

Figure 1:
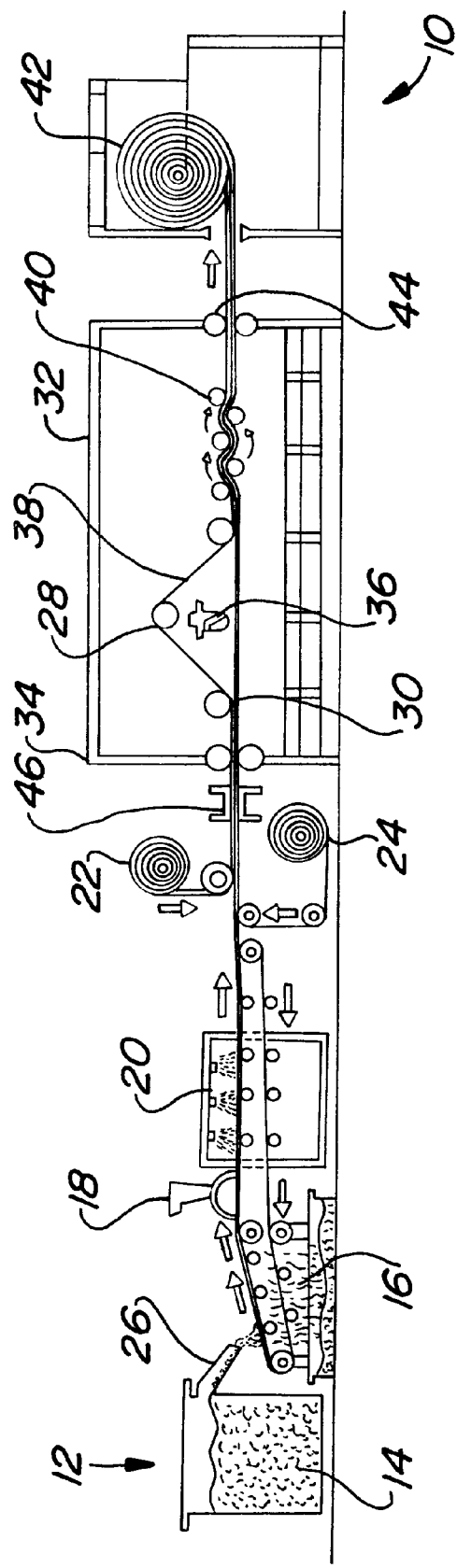
FIG. 1 is a front perspective view of the preferred embodiment of the apparatus for manufacturing sheet molding compound of the present invention.
Figure 2:
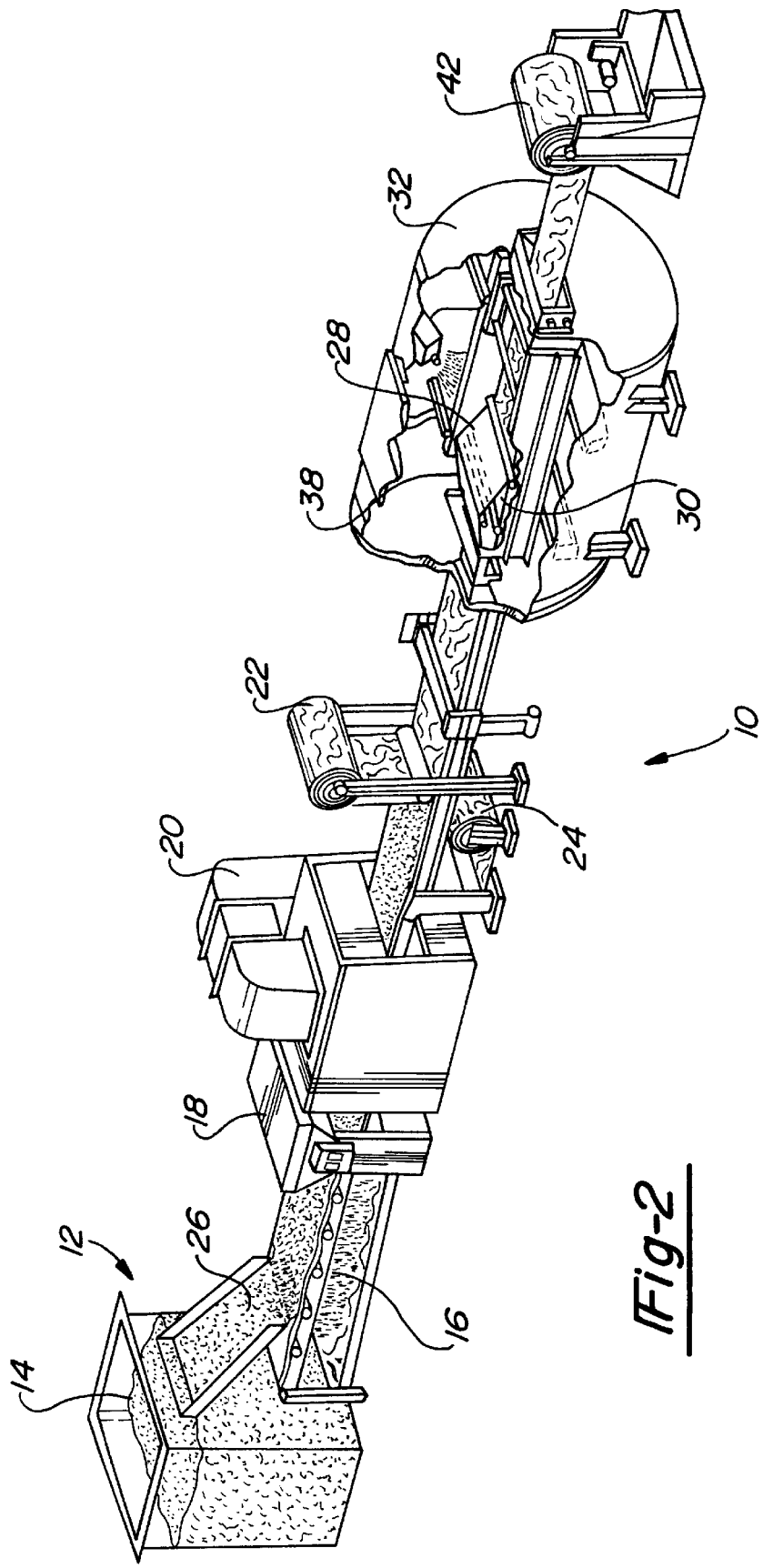
FIG. 2 is a side perspective view of the apparatus of the present invention.

Referring to FIGS. 1 and 2, a preferred embodiment of an apparatus for manufacturing sheet molding compound is illustrated and indicated generally by the numeral 10. The present invention apparatus functions to remove or minimize entrapped air from both the resin mixture and fiber web by manufacturing the sheet molding compound with reinforcing fibers under a vacuum.

Generally speaking, apparatus 10 comprises a fiber processing unit 12 for forming a fiber web which includes a fiber mixture water bath 14, a moving mechanism or wire mesh conveyor belt 16, and a soluble binder resin dispenser unit 18. Water bath 14 also preferably includes a volume adjustable spillway 26 to regulate the amount of fiber mixture that is dispensed, as shown in FIGS. 1 and 2. The processing unit may also include a dryer unit 20.

The fiber mixture employed in the present invention may be formed into a continuous wet laid web by first suspending the fibers in a water bath to form a mixture, drawing out the fiber mixture onto conveyor belt 16, adding a binder from soluble binder resin dispenser unit 18, and removing the water and drying the fiber mixture in dryer unit 20. Conveyor belt 16 is preferably wire mesh to allow the water from the bath to drop through the mesh to a water runoff. A fiber web is formed as the binder dries, causing the fibers to stick together. The fiber web may alternatively be formed from chopped rovings of fiber particles. The fiber web is preferably comprised of glass fibers, but may also be, but is not limited to, cellulose, cotton, and carbon fibers.

In the preferred embodiment, the present invention apparatus also comprises at least two plastic or polysheet film rolls, 22 and 24, respectively. The plastic film is preferably polyethylene, nylon, or a mixture of these, but may also be any standard plastic film employed in the process of manufacturing sheet molding compound. Each of film rolls 22 and 24 release a layer of plastic film onto conveyor belt 16, which is also carrying the fiber web from the fiber processing unit as shown in FIGS. 1 and 2. As the conveyor belt continues along the length of the apparatus, the fiber web is sandwiched between a first plastic layer 28 and second plastic film layer 30 from rolls 22 and 24, forming a plastic layered fiber web.

The apparatus of the present invention also includes a vacuum chamber 32 surrounding a portion of conveyor belt 16 in order to remove or minimize any entrapped air from the fiber web and resin mixture paste. The plastic layered fiber web preferably enters vacuum chamber 32 through pinch rollers 34 as shown in FIG. 1. Vacuum chamber 32 houses a resin mixture paste dispenser 36 and a separating mechanism 38, preferably a second conveyor belt, that functions to separate first plastic layer 28 from second plastic layer 30.

Referring to FIG. 1, first plastic layer 28 is removed away from the plastic layered fiber web by travelling along second conveyor belt 38. A liquid sheet or ribbon of resin mixture paste is then applied to the fiber web as shown in FIG. 1. The paste dispenser is preferably located within the area or envelope created by separating the first plastic layer along the second conveyor belt from the fiber web. Paste dispenser 36 is also preferably variably pressurized and a vacuum of about 27 to about 29 inches of Hg is preferably maintained in the vacuum chamber.

First plastic layer 28 is then returned to the fiber web via a mechanism for returning the layer, most preferably via second conveyor belt 38. The plastic layered fiber web is then conveyed through kneading rollers 40 in order to mix the fiber web into the paste, forming a sheet molding compound. The present invention apparatus functions to minimize entrapped air from both the resin mixture and fiber web while under a vacuum.

The present invention apparatus further includes an output unit 42 where the sheet molding compound with reinforcing fibers is conveyed, for example, through a second set of pinch rollers 44 and then rolled on a core or festooned in a box for further manufacturing.

Referring to FIG. 1, the present apparatus may also include an areal densitometer 46, which provides a detection reading of the plastic layered fiber web by a light source before the layer enters the vacuum chamber. The sheet molding compound also preferably maintains a constant areal weight when exiting vacuum chamber 32.

The invention has been described in detail with reference to preferred embodiments thereof. It should be understood, however, that variations and modifications can be made within the spirit and scope of the invention. For example, it is envisioned that polysheet film roll 22 may be located within the vacuum chamber, where the fiber web enters the vacuum chamber without first applying plastic layer 28 to the fiber web. A liquid sheet or ribbon of resin mixture paste may then be applied to the fiber web, and subsequently, plastic layer 28 is applied to the top of the fiber web. The plastic layered fiber web is then conveyed through kneading rollers 40 in order to mix the fiber web into the paste, forming a sheet molding compound before exiting the chamber.

Still further alternatives will become apparent to one skilled in the art after having the benefit of studying the foregoing specification and following claims.

What is claimed is:

1. An apparatus for manufacturing sheet molding compound comprising:

a) a fiber processing unit for forming a continuous fiber web;

b) a means for applying a first plastic layer onto the fiber web; and c) a vacuum chamber unit having a resin paste dispenser therein for applying paste to said fiber web within said chamber, and a mechanism for separating the first plastic layer from said fiber web; and wherein said apparatus minimizes entrapped air from said resin paste and fiber web.

2. The apparatus according to claim 1 further comprising a binder resin dispensing unit, a drying unit, and an output unit.

3. The apparatus according to claim 1 which further comprises means for sandwiching said web between at least two plastic layers.

4. The apparatus according to claim 1 wherein said paste dispenser is located within an envelope created by the separation of said first plastic layer from said fiber web by said mechanism.

5. The apparatus according to claim 4 further comprising a second mechanism for returning said first plastic layer to said fiber web before said fiber web exits said vacuum chamber.

6. The apparatus according to claim 1 wherein said mechanism for separating is a conveyor belt.

7. The apparatus according to claim 1 wherein said vacuum chamber further comprises kneading rollers.

8. The apparatus according to claim 1 wherein a vacuum of about 27 to about 29 inches of Hg is maintained in said vacuum chamber.

9. An apparatus for manufacturing sheet molding compound comprising:

(a) a fiber mixture water bath;

(b) a conveyor belt that receives said fiber mixture;

(c) a soluble binder resin dispenser unit;

(d) a dryer unit;

(e) at least two plastic film rolls that release a layer of plastic film onto said conveyor belt, wherein said fiber mixture is sandwiched between a first and second plastic layer to form a plastic layered fiber web;

(f) a vacuum chamber having disposed therein a resin paste dispenser, a first mechanism that separates said first plastic layer from said second plastic layer, and kneading rollers, wherein said paste is applied to said fiber web when said first and second plastic layers are separated, and said vacuum chamber further including a second mechanism for returning said first layer to said fiber web, thereby forming sheet molding compound; and (g) an output unit wherein said sheet molding compound is rolled or festooned in a box;

wherein said apparatus minimizes entrapped air from said sheet molding compound.

10. The apparatus according to claim 9 wherein said paste dispenser is located within the envelope created by separating said first plastic layer from said fiber web.

11. The apparatus according to claim 9 wherein a vacuum of about 27 to about 29 inches of Hg is maintained in said vacuum chamber.

\* \* \* \* \*